Patented Apr. 1, 1941

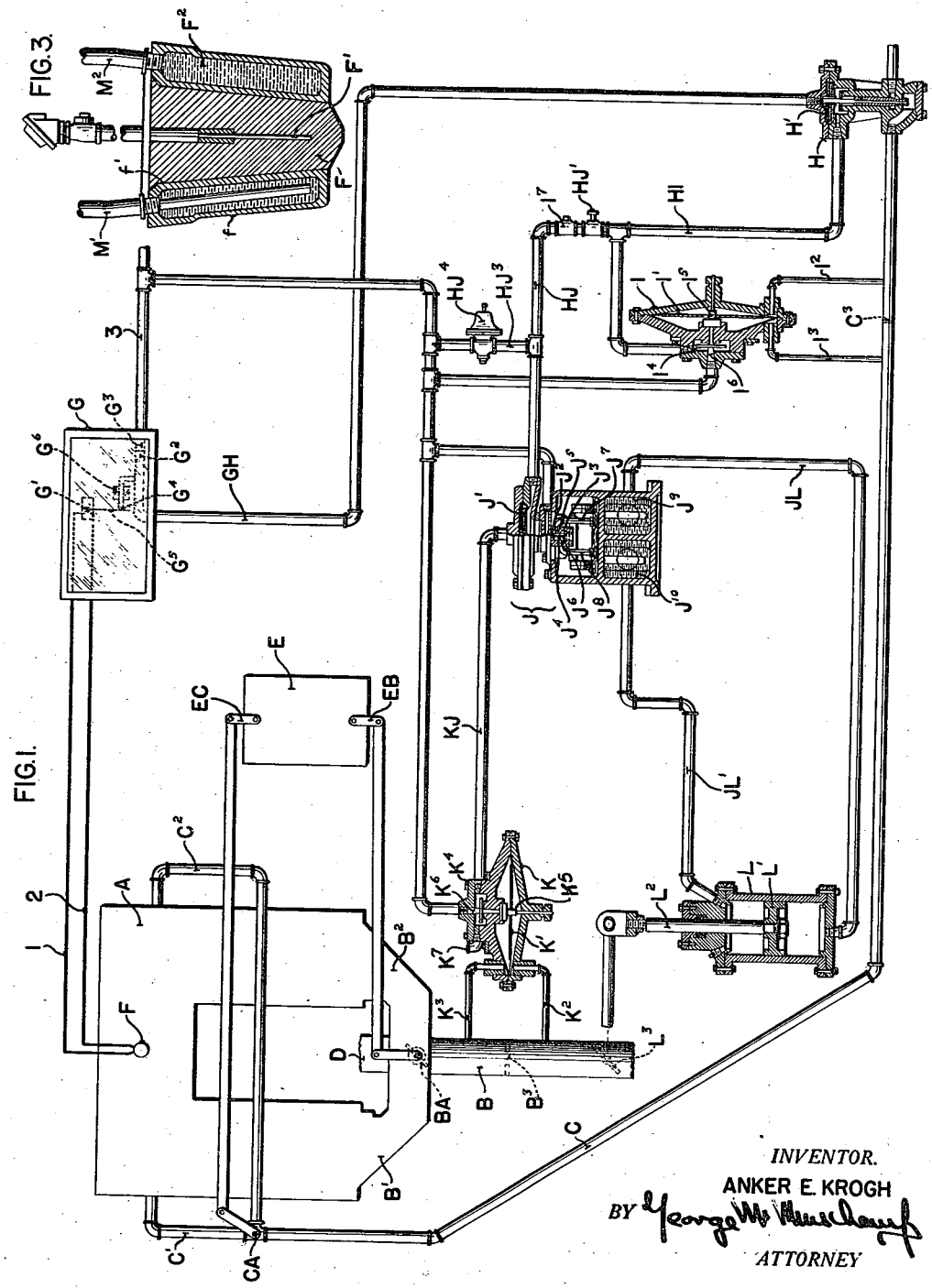

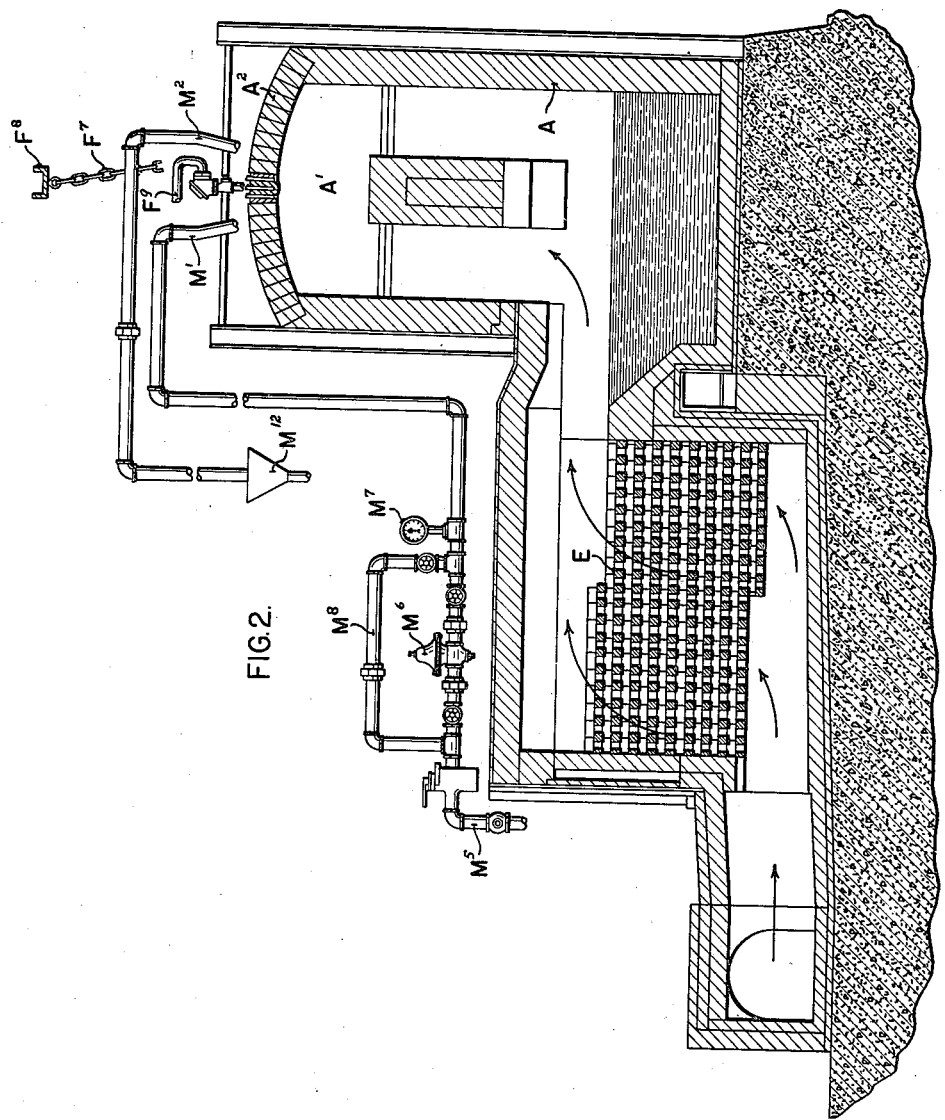

2,237,036

UNITED STATES PATENT OFFICE 2,237,036

TEMPERATURE MEASURING APPARATUS

Anker E. Krogh, Philadelphia, Pa., assignor to The Brown Instrument Company, Philadelphia, Pa., a corporation of Pennsylvania Continuation of application Serial No. 26,130, June 12, 1935. This application May 20, 1937, Serial No. 143,815

5 Claims. (Cl. 73—343)

The general object of the present invention is to provide improved control apparatus especially adapted for use in the practice of the method of measurement and control of metallurgical furnaces disclosed in my prior patent application Serial Number 26,130 filed June 12, 1935, of which this application is a continuation, but comprising novel features of construction and arrangement not restricted to such use.

My novel method of control is characterized primarily by the fact that the combustion in the furnace is controlled by and in accordance with the heat potential in the combustion chamber adjacent a highly heated portion of the combustion chamber wall. In an open hearth furnace used for annealing and other metallurgical purposes, the roof of the heating chamber above the furnace hearth, is a portion of the furnace highly heated in normal operation, and I have found that in the operation of such a furnace it is highly advantageous to regulate combustion in the furnace so as to maintain the heat potential against the roof at an approximately constant temperature. That temperature, as I have found, is a reliable indication of the performance of the furnace in practically all cases, and is especially important in the case of open hearth furnaces operated at high temperatures, because the roof is the portion of the furnace most apt to fail as a result of over-heating, and a control preventing the attainment of a critical furnace roof heat condition thus largely eliminates premature furnace failure due to over-heating. A failure of the roof of such a furnace requires the shutting down of the furnace and a time consuming and expensive furnace rebuilding operation. Maintenance of a higher and uniform average heat input to the furnace is permitted by my automatic control as distinguished from hand operation of the heat input with its attendant irregular fluctuations and consequent necessity for a wide margin of safety. Therefore with my automatic control, a faster melting time may be attained or, alternatively, a larger refractory life.

In the practical use of that invention in controlling a regenerative open hearth furnace in accordance with the heat potential against the roof, I have found that such a control tends to a desirable uniformity of operating conditions in the two regenerator chambers, serving alternately to preheat combustion air and to recover heat from the products of combustion leaving the furnace, so that with intervals of constant duration between flow reversals, the regenerator operation results obtained are satisfactory and eliminate the necessity for frequently varying the periods between flow reversals in accordance with regenerator temperatures.

It has heretofore been proposed to insert thermocouples or other heat responsive means in the roofs of furnaces either with or without protecting tubes but such devices are responsive to the temperature of the roof or some portion of it and accordingly are slow in responding to temperature changes in the furnace due to the high heat capacity or inertia of the roof. It is desirable for purposes of control and for purposes of indicating and recording in most cases, to obtain the rapid response made possible with my invention in order that a corrective step may be quickly taken to check any undesirable trends. By the construction and arrangement of the device of my invention I render the thermocouple substantially independent of the cumulative heating effect to which furnace walls and roofs are subjected when heated over long periods of time and thereby permit the immediate measurement of the heat potential on said wall or roof.

For the general purposes of my novel control method, the heat potential against the roof may be measured by means of the temperature responsive device of my invention, and my invention includes novel cooled thermocouple constructions mounted in a furnace roof.

For the attainment of the best results in furnace operation, it is ordinarily desirable to maintain a constant ratio of combustion air to fuel, which may be oil or gas, depending on conditions. Uniformity in that ratio is especially important in many cases, also, because it insures a corresponding uniformity in the oxidizing, neutral or reducing character of the combustion chamber atmosphere which is made desirable by the particular conditions of use. My improved control apparatus comprises novel and effective provisions for supplying fuel and air at suitably proportioned rates.

My improved control apparatus in its preferred form includes various fluid pressure controlled elements which are made subject to the master control of the heat potential against the roof, by means of a master controller of known or suitable type creating a fluid control pressure which is a function of said temperature condition.

The various features of novelty characterizing the present invention are pointed out with particularity in the claims annexed to and forming a part of this specification. For a better understanding of the invention, however, its advantages, and particular objects obtained with its use, reference should be had to the accompanying drawings and descriptive matter in which I have illustrated and described preferred forms of apparatus embodying and utilized in the practice of the invention.

Of the drawings:

Fig. 1 is a diagrammatic representation of an open hearth furnace control system;

Fig. 2 is a sectional elevation of an open hearth regenerative furnace of conventional type having a water cooled thermocouple mounted in its crown;

Fig. 3 is a sectional elevation on a larger scale than Fig. 2 of the water cooled thermocouple.

In the embodiment of the invention illustrated in Figs. 1, 2, and 3, an open hearth regenerative furnace A is supplied with combustion air through a conduit B, and with fuel through a conduit C. A reversing valve BA is employed to connect the air supply conduit B to the regenerator inlet B' during periods which alternate with periods during which the conduit B is connected to the other regenerator inlet B². A reversing valve CA similarly connects the discharge end of the fuel conduit C to a branch C' opening at one side of the furnace combustion chamber A' during periods which alternate with those during which the conduit C is connected to a branch C² opening to the opposite side of the combustion chamber. A reversing valve BA connects the outlet B' from one of the regenerators to a stack connection or off-take flue D during periods in which combustion air is being supplied to the inlet B² of the other regenerator, and connects the outlet B² from the last mentioned regenerator to the off-take D while air is being supplied from the conduit B to the regenerator inlet B'. The different reversal valves BA and CA may be operated at regular time intervals, and through the usual operating means, by a common time controlled reversing mechanism E of any usual or suitable type. As diagrammatically shown, the reversing mechanism E includes separate oscillating operating arms EB and EC for, and link connected to the operating arms of the reversing valves BA and CA respectively.

When the fuel transmitted by the pipe C is oil, it will ordinarily be necessary or desirable to employ atomizing burners, and steam supply connections including reversing valves for supplying steam to each burner at times when that burner is receiving oil through the corresponding fuel branch pipe C' or C², but as said burners and connections are well known and form no part of the present invention, and are not needed when the fuel supplied by the pipe C is a gas, no illustration or further reference to such burners and steam supply connections seems necessary herein.

The control system shown diagrammatically in Fig. 1, comprises a furnace roof temperature responsive element F in the form of a thermocouple having its terminals connected by thermocouple leads 1 and 2 to the terminals of a master control instrument G. The latter receives compressed air from a compressed air supply piping system 3, and operates to maintain an air in a pipe GH which is determined by, and is a function of the thermocouple voltage impressed on the instrument G by the conductors 1 and 2. The master control pressure transmitted from the master controller G by the pipe GH is impressed on a regular valve H which regulates the fuel feed or flow through the conduit C.

The regulator H is of the reaction type, comprising a flexible valve operating diaphragm H' on one side of which is impressed the pressure transmitted by the pipe GH, while the opposite side of the diaphragm is subjected to a pressure transmitted to the regulator H by a pipe HI and constituting a measure of the flow through the conduit C. The pressure in the conduit HI is determined by an element I which I call a static converter. The element I includes a flexible diaphragm I' dividing a pressure chamber into two compartments, one of which is connected by a pipe I² to the conduit C at the inlet, or upflow, side of a restricted measuring orifice C³ in the conduit. The compartment at the opposite side of the diaphragm I' is connected by a pipe I³ to the conduit C at the outlet, or downflow side, of the measuring orifice C³. The element I includes a balancing pressure chamber I⁴, having its wall adjacent the diaphragm I' formed by a flexible diaphragm connected to the diaphragm I' by a stem or plunger element I⁵. The latter carries at one end a valve I⁶ controlling the admission to the chamber I⁴ of compressed air supplied by a branch of the compressed air supply pipe system 3. Through a restricted bleeder outlet I⁷ in a pipe connected to the chamber I⁴, air constantly escapes from said chamber to the atmosphere at a rate lower than that at which air is passed to the chamber by the valve I⁶ in the wide open condition of the latter. The pipe HI is connected to the chamber I⁴.

As will be apparent in the operation of the element I, the valve I⁶ is automatically adjusted by the fluid pressures acting on its diaphragms as required to maintain a pressure in the chamber I⁴ proportional to the excess of the pressure transmitted by the pipe I² over that transmitted by the pipe I³. The pressure in the chamber I⁴ is thus proportional to the pressure drop through the measuring orifice C³, and hence is a measure of the flow through the conduit C. As will be apparent, the opposing actions of the pressures transmitted by the pipes GH and HI to the opposite sides of the diaphragm H' of the regulator valve H, will normally maintain that valve in the adjustment required to balance those pressures, and thereby to make the rate of flow through the conduit C a function of the master control pressure transmitted to the regulator H by the pipe GH.

The device K is a device, similar to the device I, creating a regulator pressure force which is proportional to the difference between the pressures at the inlet and outlet sides of a measuring orifice B³ in the conduit B, and therefore is a measure of the rate of flow through the conduit B. The static converter K includes and has associated with it parts K'—K⁷, respectively, corresponding to the above mentioned parts I'—I⁷. The measuring pressure chamber K⁴ of the element K is supplied with compressed air through a branch from the compressed air supply piping 3, and the regulator pressure in the chamber K⁴ is transmitted by a pipe KJ to an element J.

The element J forms the motor pressure control valve element of an air-hydraulic regulator employed to adjust a damper L³ in the supply pipe B as required to maintain such a rate of flow through the conduit B, that the pressure in the measuring pressure chamber $K^4$ of the element K will be equal, or proportional to the pressure in the measuring pressure chamber $I^4$ of the element I. This means, as is readily apparent, that a constant proportion is maintained between the flows in the conduits C and B, and that the flow through the conduit B bears the same relation to the master control pressure in the pipe GH, as does the flow through the conduit C. The ratio of the pressure in chamber $I^4$ to that in $K^4$ may be varied by a valve HJ' which is placed in pipe HJ so as to reduce, if necessary, the pressure in HJ below the pressure in chamber $I^4$ and thereby vary the ratio of the flow in conduit C to that in conduit B.

As diagrammatically shown, the control element J includes a pressure chamber divided into two compartments by a flexible diaphragm J', the pipe KJ being connected to one, and the pipe HJ to the other of the two compartments. The central portion of the diaphragm J' is connected to, and gives movement to, a piston valve $J^2$ which, in effect, is a D-valve working in a valve casing $J^3$. The valve $J^2$ serves in one position to connect a compressed air supply port $J^4$ to a port $J^5$ in the valve casing, while at the same time permitting free flow through a third port $J^6$. In a second and lower position, the valve member $J^2$ connects the supply port $J^4$ to the port $J^6$ and permits free flow through the port $J^5$. The port $J^4$ is connected to a branch of the compressed air supply piping 3. The port $J^5$ is connected by a conduit $J^7$ to a pressure chamber $J^9$. The port $J^6$ is connected by a pipe $J^8$ to a pressure chamber $J^{10}$.

The pressure chamber $J^9$ is connected by a pipe JL to one end of the cylinder of a reciprocating hydraulic servo-motor L, and the chamber $J^{10}$ is connected by a pipe JL' to the opposite end of that cylinder. The piston L' of the servo-motor has its stem operatively connected to the operating arm $L^2$ of a damper $L^3$ in the pipe B, so that as the piston L' is moved in one direction or the other, up or down as shown in Fig. 1, the damper $L^3$ is given an opening or closing adjustment. As indicated in Fig. 1, the cylinder of the servo-motor L, and the pipes JL and JL' are filled, and the pressure chambers $J^9$ and $J^{10}$ are partially filled by a liquid, ordinarily oil, which is displaced as required to effect servo-motor movements, by compressed air supplied by the control element J to one or the other of the chambers $J^9$ and $J^{10}$, according to the adjustment of the valve member $J^2$.

The air-hydraulic regulator comprising the control element J, the servo-motor L, and their inter-connecting provisions diagrammatically illustrated in Fig. 1, in practice may advantageously include means for preventing drift or undesired movements of the piston L', means for regulating the speed of movement of that piston in response to adjustments of the valve $J^2$, and various other special features of construction and arrangement which was not, and need not be illustrated in Fig. 1, as they form no part of the present invention, and are fully disclosed in the patent of Andrew J. Fisher, Number 2,137,607, granted November 22, 1938, in which is disclosed and claimed a preferred practical form of an air-hydraulic regulator including the features illustrated in Fig. 1 and the above mentioned special features.

The thermocouple construction and arrangement illustrated in Figs. 2 and 3, comprises special provisions for mounting the thermocouple in the roof $A^3$ over the combustion chamber A' of the furnace A, and for cooling parts of the thermocouple structure and mounting which need to be cooled to prevent injurious over-heating. As shown in Fig. 3, the hot junction F'' of the thermocouple is imbedded in a block F of carborundum or analogous refractory material of relatively good heat conductivity.

In the arrangement shown, the outer surface of the block F is in the form of a section of a cone and is normally seated in the similarly conical passage f' through the water cooled thermocouple mounting member f. The latter is formed of metal and is provided with a hollow wall or chamber space $F^2$ through which circulates cooling water supplied by a pipe M' and discharged through a pipe $M^2$. To prevent the dropping of the members F and f and the connected water pipes into the furnace in the event of collapse of the roof, a chain suspension $F^7$ supported at $F^8$ is attached to member f in any suitable manner. The members F or f need not be disturbed when the thermocouple proper is removed for thermocouple repair or replacement or for other purposes.

In the arrangement shown in Fig. 2, cooling water is supplied to the pipe M' through a branch from a water supply pipe $M^5$, the branch including a pressure regulator $M^6$ and having attached to it a pressure gage $M^7$. A valved by-pass $M^8$ about the regulator $M^6$ permits water to be supplied to the pipe M' at times at which the regulator $M^6$ is subject to adjustment or repairs, or is otherwise inoperative. As shown the outlet pipe $M^2$ discharges into a waste or return connection $M^{12}$. In practice, the thermocouple leads 1 and 2 shown in Fig. 1 are enclosed in a flexible cable $F^9$ as shown in Figs. 2 and 3.

In the operation of the fluid cooled thermocouple arrangement, the cooling water or other fluid is passed through the member f at a rate sufficient to withdraw heat from the member F at approximately the rate at which heat is supplied. Thus the temperature responsive element is not subjected to the cumulative heat effect or "soaking" condition of the furnace roof, to which the latter is subjected after being heated for a period of time. The rate of application of the cooling medium is, however, insufficient to cause a condensation of the gases surrounding the member F. Such a condensation would result in the forming of slag thereby affecting the heat transfer relation and a consequent undesirable effect upon the calibration of the measuring system. I have found that with a volume of approximately one quarter of a cubic foot, that a quantity flow of about five cubic feet per minute is satisfactory.

For the general purposes of the present invention, the master controller G may be of any usual or suitable form adapted to maintain a master control fluid pressure force in the pipe GH which is a suitable predetermined function of the temperature to which the thermocouple F responds. As shown in Fig. 1, the controller G comprises a volt meter having an element G' which deflects counter-clockwise or clockwise, accordingly, as a fall or rise in the heat potential against the roof decreases or increases the thermocouple voltage transmitted to the meter by the conductors 1 and 2. As diagrammatically shown, the pipe GH is connected to a conduit $G^2$ receiving air from the compressed air supply piping system 3 through a restricted orifice $G^3$, and having an outlet port $G^4$. Flow through the port $G^4$, and thereby the pressure in the pipes $G^2$ and GH, is regulated by a flapper valve $G^5$ adjusted by the deflection of the element $G'$, as required to decrease or increase the flow through the port $G^4$ and thereby raise or lower the pressure in the pipes $G^2$ and GH as the heat potential against the furnace roof decreases and increases. As diagrammatically shown, an adjusting device $G^6$ is employed to adjust the position of the port $G^4$ longitudinally of the path of deflection of the valve member $G^5$, so that the heat potential against the roof which the control system tends to maintain may be varied as conditions make desirable.

One form of master controller which I regard as especially well adapted for the purposes of the present invention, is the potentiometric air controller disclosed and claimed in the Harrison Patent No. 2,112,091, granted March 22, 1938, on an application filed February 5, 1934. That instrument has the above mentioned general characteristics of the instrument G, and has special operative characteristics and structural features which need not be illustrated or described herein.

The general mode of operation of the control apparatus illustrated herein has been indicated in the foregoing description. With a suitable constant, or approximately constant air pressure in the supply piping system 3, the pressure maintained in the pipes $G^2$ and GH will depend upon the heat potential on the furnace roof to which the thermocouple F responds, and like the latter will be maintained approximately constant at values determined by the adjustment of the adjusting device $G^6$. When the heat potential impressed on the furnace roof falls below the normal value fixed by an existing adjustment of the device $G^6$, the resultant deflection of the master controller element $G'$ will move the valve member $G^5$ toward the outlet $G^4$ throttling the escape of air through the latter. This increases the pressure in the pipe $G^2$ and gives an opening adjustment to the fuel valve member regulator H. The device I and H cooperate as previously described to make the increase in the fuel flow a function of the increase in the pressure transmitted to the device H by the pipe GH. The increased pressure in the pipe HI resulting from the increased flow in the conduit C which occurs on an increase in the pressure in the pipe GH, is transmitted through pipe HJ to the device J. The latter then operates in conjunction with the device K to actuate the air-hydraulic regulator L and adjust the valve $L^3$ as required to so increase the combustion air supply through the conduit B as to maintain the desired constant air-fuel ratio. The maintenance of that ratio insures efficient combustion conditions, as well as the maintenance of the desired oxidizing, neutral or reducing character of the atmosphere within the furnace chamber $A'$, which is practically important in some cases. For example, in an open-hearth furnace, it is ordinarily quite important to maintain an oxidizing atmosphere in the furnace chamber. When the heat potential impressed on the furnace roof rises above that fixed as normal by the existing adjustment of the device $G^6$, the rates of fuel and air supply through the conduit C and B respectively, are proportionally reduced, through operations which are the converse of those described above as occurring when the heat potential on the furnace roof decreases.

As hereinbefore described, the conduit HJ was considered as an uninterrupted connection between element $I^7$ and regulator J. I have found, however, that the addition of a connection such as the connection $HJ^3$ between the supply conduit 3 and the pipe HJ affords an additional means of flexibility in operation whereby the regulator J may be loaded independently of the element I. Inserted in the connection $HJ^3$ is a pressure regulator $HJ^4$, which is so adjusted that when the pressure in the line HJ falls below a predetermined minimum the pressure regulator will act to admit fluid pressure from the fluid supply line 3 thereby maintaining the pressure in line HJ at said predetermined minimum. The pressure at which the regulator $HJ^4$ tends to maintain the pressure in line HJ may be made below the lowest pressure maintained in line HJ as a result of the lowest normal fuel supply to which the differential static converter I is responsive so that the regulator $HJ^4$ would come into play only when the fuel valve H is entirely cut off. With a fuel supply flowing through the line C at any rate normally called for by the regulator G, the regulator $HJ^4$ would therefore cut off connection between the supply pipe 3 and the connection HJ.

In effect, therefore, the action of the regulator $HJ^4$ may be made such as to maintain a predetermined minimum air flow irrespective of the fuel cut off which may occur as a result of the action of regulator G when the temperature condition to which the latter is responsive drops to a predetermined minimum. The maintenance of a predetermined minimum air flow after the fuel has been appreciably reduced or cut off is of considerable practical importance in some cases. Thus when the furnace roof heat condition becomes dangerously high and the fuel supply rate is reduced or cut off, the continuing flow of air through the combustion chamber of the furnace will result in a desirable reduction of furnace temperature more quickly than can be reduced by merely reducing or cutting off the fuel supply. While the air then entering the combustion chamber and wholly or largely passing through the latter without uniting in combination with fuel, is preheated by its passage through one or the other air regenerative chamber, it will not be preheated to the temperature then prevailing in the combustion chamber, and will absorb heat in that chamber and carry it out of the latter. The very fact that the air is preheated to a temperature approaching that in the furnace chamber before entering the latter, prevents the air from having a chilling effect injurious to the furnace or its charge. Most of the heat carried out of the furnace chamber by the excess air, is recovered in the regenerative chamber then receiving the outflow of gases from the furnace chamber.

An important advantage of the apparatus of Fig. 1, when the predetermined air supply regulator $HJ^4$ is employed, particularly in connection with metallurgical or other furnaces in which analogous reactions occur, arises from the chemical combination of the excess oxygen supply, following a fuel cut off with carbon monoxide or other combustibles liberated by the metal bath as the result of the melting down of a charge of metal. Such liberation of the combustible gases by the bath is particularly pronounced at a time during the heat when it is desirable to reduce the fuel supply and in the arrangement of Fig. 1 without the pressure regulator $HJ^4$, a cessation of the fuel supply would be accompanied by a cessation of the supply of combustion supporting air whereas the arrangement utilizing the pressure regulator HJ4 permits an excess of oxygen supply above that required for combustion of the fuel and insufficient amount to support combustion of the combustibles liberated by the bath.

The above described control apparatus is desirably simple and reliable in operation and well adapted for the control of regenerative open hearth furnaces used for various purposes and for other furnace control purposes. The general advantages of the control of the rate of combustion in the furnace combustion chamber by and in accordance with the heat potential against the roof of that chamber, have already been mentioned. The special thermocouple construction illustrated in Figs. 2 and 3 not only provides means responsive to the significant conditions and comprises desirable water cooling provisions to protect the thermocouple and its mounting against dangerous over-heating, but is characterized by the ease with which the portion of the thermocouple which needs to be inspected, repaired, and replaced, from time to time, may be removed without subjecting the furnace roof masonry to injury. As those skilled in the art will understand, there is some tendency for the masonry in contact with and immediately adjacent to the water cooled member $f$ to crack and spall. The effect of the cracking and spalling is ordinarily not at all serious if the mounting member $f$ remains permanently seated in the masonry, but might result in serious injury to the furnace roof, if it were necessary to remove and replace the member $f$ from time to time.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Means for measuring the temperature at the combustion chamber side of a highly heated furnace combustion chamber wall, comprising a water cooled mounting element mounted in said wall, a block of refractory mounted in said element and composed of material having relatively high heat conductivity, a temperature responsive element mounted in said block and responsive to the temperature of the latter, and means deflected by said element.

2. Means for measuring the temperature at the combustion chamber side of a highly heated furnace combustion chamber wall, comprising a water cooled mounting element mounted in said wall, a block of carborundum mounted in said element, a temperature responsive means mounted in said block and responsive to the temperature of the latter, and means deflected by said element.

3. Means for measuring the temperature at the combustion chamber side of a highly heated furnace combustion chamber wall comprising a block of refractory mounted in said wall and composed of material having a relatively high heat conductivity, a temperature responsive element mounted in said block means for laterally withdrawing heat from said block at approximately the rate at which heat is supplied to said block, and means deflected by said element.

4. Means for measuring the temperature at the combustion chamber side of a highly heated furnace combustion chamber wall, said wall being responsive to the cumulative effect of heat applied over an extended period comprising a block of refractory mounted in said wall and composed of a material having a relatively high heat conductivity, a temperature responsive element mounted in said block, cooling means for maintaining the heat condition of said block sufficiently different from the heat condition existing in said furnace that minor fluctuations in the operation of said cooling means is substantially ineffective upon the magnitude of the response of said element, and means deflected by said element.

5. Means for measuring a temperature which is a function of the temperature of a heated chamber comprising, a chamber, a block of refractory material of relatively high heat conductivity mounted in a wall of said chamber, a temperature responsive element mounted within said block, means deflected by said temperature responsive element, cooling means associated with said block for insulating said block from the heat condition existing in the wall of said chamber and also being so operated that minor fluctuations in the operation of the cooling means causes no substantial effect upon the operation of the deflected means.

ANKER E. KROGH.